Patented Mar. 30, 1926.

1,579,032

UNITED STATES PATENT OFFICE.

FRANÇOIS RICHARD, OF CLEVELAND, OHIO.

PROCESS OF MAKING A VITRIFIED COMPOSITION.

No Drawing. Application filed December 4, 1920. Serial No. 428,359.

*To all whom it may concern:*

Be it known that I, FRANÇOIS RICHARD, a citizen of the United States, residing at Cleveland, in the State of Ohio and Cuyahoga County, have invented a new and useful Improvement in Processes of Making a Vitrified Composition, of which the following is a specification, the principle of the invention being herein explained and the best mode in which I have contemplated applying that principle, so as to distinguish it from other inventions.

My invention relates to the method of baking a natural clay so that is becomes uniformly fused or wholly vitrified.

One object of my invention is the manufacture of an excellent dielectric from an easily obtainable and therefore cheap natural product. Another object is to manufacture a vitric or non-porous insulator. A further object has been to cheapen the cost of the baking operation both by shortening the time required and by greatly reducing the maximum temperature required in the oven or kiln.

Two uses to which I have contemplated adapting my product are in the form of spark plugs and paving bricks.

As is well known spark plugs are subjected to exceedingly severe requirements both in their capability to resist breakage in consequence of the tremendous variation in temperatures to which they are alternatively subjected. They must furthermore withstand enormous voltages. To satisfy these requirements various grades of porcelain are in common use, but porcelain is expensive for two reasons, first, because of the comparative rarity of white clays and second, because of the high temperatures required for protracted periods in its manufacture, for example, a certain clay imported from Italy is required to be left in the kiln twelve days. Another well known porcelain is reputed to be kept at a temperature twenty-six hundred (2600°) degrees for eighteen days.

The product of my invention further commends itself as of practical application in the manufacture of paving bricks because of its hardness and toughness and because comparatively low temperature of a relatively short period required to obtain it as a vitrified mass.

The natural clay which I employ has been analyzed to comprise percentages of ingredients as follows;

Silica (fifty-six and two tenths) 56.20, titanic acid .08, sesquioxide of iron 8.30, alumina 20.94, lime .57, magnesia 1.66, manganese monoxide .06, alkalies 4.08, sulphur trioxide .13, loss on ignition 8.07.

The clay is whitish gray but upon becoming baked assumes a reddish brown color. I consider the essential ingredients to be the silica and alkalies either one or both of the latter serving principally to lower the fusion temperature or enable realization of the desired vitrifaction at a greatly reduced temperature as compared with the temperature required to produce porcelain. A clay having high alkali content is therefore desirable.

The subject matter of this application may be considered as more exactly defining the results of further experiments and experience with the invention shown described and claimed in Patent No. 1,329,094, issued January 27, 1920, to François Richard and Francis M. Brady.

Preferably, the clay is first pulverized then caused to assume a more plastic state by the addition of water so that it may be worked or molded in any desired shape. Then the moisture is slowly driven off and thereafter the temperature is raised to about nine hundred (900°) degrees Fahrenheit which is maintained for several hours depending upon the cubical contents of the piece. Finally, the temperature is raised to between fifteen hundred (1500°) and sixteen hundred (1600°) degrees Fahrenheit. I have found fifteen hundred (1500°) degrees F. very successful. The length of time at which the substance is kept at such highest temperature is determined by the thickness of the piece and by experiment teaching when a piece of known size and shape is uniformly vitrified throughout. It is not known to just what extent the percentages of oxide of iron and the alkalies may be varied, doubtless, the greater the per cent of oxide the shorter the period of time required for maintaining the piece at the temperature of about fifteen hundred fifty (1550°) degrees F. Most of my demonstrations have shown vitrification to commence about fifteen hundred thirty (1530°)

degrees F. It is peculiar that if the temperature be raised above sixteen hundred (1600°) degrees F. my objects will be frustrated of attainment.

My insulator will withstand a temperature of eleven hundred (1100°) degrees Fahrenheit and without being glazed thirty thousand (30,000) volts.

It is my discovery that the comparatively low maximum temperature of from fifteen hundred to sixteen hundred (1500-1600°) degrees Fahrenheit may not be exceeded without risk of soon passing the temperature of commercial success which marks the special contribution of this application to the art.

I am aware that clay compounds have been both partly and wholly vitrified. However, a clay composed of the ingredients herein set forth would be supposed, even by experienced chemists, not to uniformly vitrify except at the very high temperature of about thirty-five hundred degrees (3500°) Fahrenheit. Commercially such temperatures inevitably mean an expensive product, involving also the factor of excessive time.

The kernel of my discovery is that homogeneous vitrification can be obtained at the comparatively low and correspondingly economical temperature of from fifteen hundred to sixteen hundred degrees (1500°-1600°) Fahrenheit. The presence of either or both of these is well known to reduce the fusion temperature, but I claim that it has not been known that a comparatively low heating stage existed which if maintained for an ascertainable length of time could effect complete and uniform vitrification realized without increasing the temperature. That temperature in the case of the clay I use, varies between the limits above given, being lower when the amount of oxides and alkalies is greater and vice versa. The length of time during which to maintain the temperature after fusion commences varies according to the size of the mass, being required to be longer when the mass is large than when it is small.

Pieces adapted for spark plug use have required several hours in the oven.

The duration of time at the maximum temperature I require depends upon the length of time it required to reach the maximum temperature. If, after the mass has been gradually dried and reached a temperature of about 900° Fahrenheit, it has been rapidly raised to 1550° Fahrenheit it will be necessary to longer hold it at such maximum. If the total time be three hours, and two hours were required to raise the temperature from 900° F.-1550° F. only one hour at the maximum temperature would be necessary, whereas if, with the same size of piece, its temperature was raised from 900°-1550° in one hour, it should be held at the maximum temperature for two hours.

I claim:—

1. The process of making a vitrified insulator which consists in mixing a natural clay containing about fifty-six per cent of silica, about twenty per cent of alumina, about eight per cent of sesquioxide of iron, and alkalies, with enough water to make a plastic mass, molding to desired shape, heating to about 900° Fahrenheit and then raising the temperature to not over 1600° Fahrenheit and then maintaining the temperature at not over 1600° Fahrenheit whereby to wholly vitrify the mass and then allowing to cool.

2. The process of making a vitrified insulator which consists in mixing a natural clay containing about fifty to sixty per cent of silica, about twenty per cent of alumina, about eight per cent of sesquioxide of iron, about four per cent of alkalies, and the balance magnesia, lime, sulphur and manganese with enough water to make a plastic mass, shaping the mass, heating to about 900° Fahrenheit and maintaining such temperature for several hours depending upon its size, and then raising the temperature to 1500° Fahrenheit whereby to vitrify the whole.

3. The hereindescribed process of producing a vitrified composition which consists in subjecting a mass of clay containing about fifty-five per cent of silica, about twenty per ment of alumina, about ten per cent of an iron oxide and about four per cent of alkali to a temperature sufficient to drive off the moisture, and then gradually raising the temperature to between 1500° and 1600° Fahrenheit to achieve substantially homogeneous vitrification.

Signed by me, this 30th day of October, 1920.

FRANÇOIS RICHARD.